(12) United States Patent
Rossi (10) Patent No.: US 7,476,147 B2
(45) Date of Patent: Jan. 13, 2009

(54) BELT FED FOOD CASING SYSTEM

(75) Inventor: Scott James Rossi, Danville, IL (US)

(73) Assignee: ViskoTeepak Belgium NV, Lommel (BE)

( * ) Notice: Subject to any disclaimer, the term of this patent is extended or adjusted under 35 U.S.C. 154(b) by 32 days.

(21) Appl. No.: 10/837,989

(22) Filed: May 3, 2004

(65) Prior Publication Data

US 2005/0245186 A1 Nov. 3, 2005

(51) Int. Cl.
*A22C 11/00* (2006.01)
*A22C 11/02* (2006.01)
*A22C 13/00* (2006.01)

(52) U.S. Cl. .......................... 452/32; 452/37
(58) Field of Classification Search ................... 452/30, 452/32, 37, 39
See application file for complete search history.

(56) References Cited

U.S. PATENT DOCUMENTS

| | | | |
|---|---|---|---|
| 4,013,099 A | | 3/1977 | Gerigk et al. |
| 4,034,536 A | * | 7/1977 | Mahaffy et al. ................ 53/433 |
| 4,209,540 A | * | 6/1980 | Jones, Jr. ..................... 426/414 |
| 4,306,334 A | * | 12/1981 | Niedecker .................... 452/34 |
| 4,371,554 A | * | 2/1983 | Becker ........................ 426/243 |
| 4,420,440 A | * | 12/1983 | Marz ........................... 264/3.3 |
| 4,614,076 A | * | 9/1986 | Rathemacher ................ 53/433 |
| 4,671,414 A | | 6/1987 | Bandt et al. |
| 5,046,219 A | | 9/1991 | Stanley |
| 5,053,239 A | * | 10/1991 | Vanhatalo et al. ............ 426/412 |
| 5,129,512 A | * | 7/1992 | Garwood ................. 206/213.1 |
| 5,156,566 A | * | 10/1992 | Righele ....................... 452/46 |
| 5,514,029 A | * | 5/1996 | Schutz ......................... 452/35 |
| 5,720,149 A | * | 2/1998 | Stimpfl ........................ 53/244 |

(Continued)

FOREIGN PATENT DOCUMENTS

DE 23 51 283 4/1975

(Continued)

OTHER PUBLICATIONS

Notification of Transmittal of the International Search Report and the Written Opinion of the International Searching Authority, or the Declaration (1 page), International Search Report (7 pages), and Written Opinion of the International Searching Authority (12 pages), mailed Oct. 18, 2005 for International Application No. PCT/US2004/036731 filed Nov. 4, 2005.

(Continued)

*Primary Examiner*—David J Parsley
(74) *Attorney, Agent, or Firm*—Fish & Richardson P.C.

(57) ABSTRACT

Shirred casing is packaged in pockets on a belt to assist in the stuffing of the shirred casing by an automated stuffing machine. The package is made up of a belt with pockets for the shirred casings. The pockets provide structural integrity to the shirred casings and are spaced evenly for automated handling. The automated stuffing machine has a strand drum with indentations to receive the pocket of the package. The strand drum acts as an indexing mechanism to position each successive pocket so that the shirred casings within may be stuffed. A stuffing horn moves between a stuffing position and an indexing position that is clear of the strand drum. A method for automating the stuffing of shirred casings is disclosed as well.

14 Claims, 7 Drawing Sheets

U.S. PATENT DOCUMENTS

| | | | | |
|---|---|---|---|---|
| 5,820,904 A | * | 10/1998 | Mello et al. | 426/119 |
| 6,117,465 A | * | 9/2000 | Falla | 426/127 |
| 6,135,869 A | * | 10/2000 | Schutz | 452/32 |
| 6,641,474 B1 | | 11/2003 | Hergott et al. | |
| 2004/0038636 A1 | | 2/2004 | Sawhill et al. | |

FOREIGN PATENT DOCUMENTS

| | | | |
|---|---|---|---|
| DE | 10111136 | | 9/2002 |
| EP | 0318237 | | 5/1989 |
| FR | 2677522 | * | 12/1992 |
| JP | 2000-255522 | * | 9/2000 |
| WO | WO 99/59416 | | 11/1999 |
| WO | WO 02/074093 | * | 9/2002 |

OTHER PUBLICATIONS

Annex to Form PCT/ISA/206—Communication Relating to the Results of the Partial International Search Report issued in PCT Application No. PCT/US2004/036731; Apr. 21, 2005; 3 pages.

International Preliminary Report on Patentability issued in International Application No. PCT/US2004/036731; Aug. 7, 2006; 19 pages.

Communication Pursuant to Article 96(2) EPC issued in European Application No. 04821999.2; Aug. 8, 2007; 4 pages.

* cited by examiner

BELT FED FOOD CASING SYSTEM

TECHNICAL FIELD

The present invention relates to a method and apparatus for automating the loading of a stuffing machine in the cased food products industry. The method and articles disclosed are particularly useful in automating the loading of moisturized shirred fibrous casing strands, but may be applied to other types of casings.

BACKGROUND

One problem preventing the automation of loading moisturized shirred fibrous casing strands into a stuffing machine is that such strands lack structural rigidity. Automation methods used for more rigid shirred casing strands have not worked with moisturized shirred fibrous casing strands because of this lack of rigidity.

Currently, the following multi-step process loads stuffing machines using moisturized shirred fibrous casing strands:

Stop meat pump and stuffing machinery;
Manually move stuffing horn from stuffing position to loading position;
If horn ring is used, remove horn ring;
Slide wrapped strand of moisturized shirred fibrous casing onto horn;
If horn ring was removed, replace horn ring;
Manually move stuffing horn from loading position to stuffing position;
Manually locate the first end of the shirred casing and manually place first end through clippers;
Manually activate clippers to secure a clip on the first end of the shirred casing;
Manually remove overwrap from shirred casing (this step may be done anytime after placement on the horn and before restarting.);
Restart meat pump and stuffing machinery.

This manual process requires about 15 to 20 seconds, if done well, and must be performed approximately every two minutes, depending on stuffing rate and the length of shirred casing. In part because of this operation, each stuffing machine is typically run by its own operator. By automating this part of the stuffing process an operator may run more than one stuffing machine, thus increasing efficiency and reducing costs.

SUMMARY

Shirred casing is packaged in pockets on a belt to assist in the stuffing of the shirred casing by an automated stuffing machine. The package is made up of a belt with pockets for the shirred casings. The pockets provide structural integrity to the shirred casings and are spaced evenly for automated handling. The automated stuffing machine has a strand drum with indentations to receive the pocket of the package. The strand drum acts as an indexing mechanism to position each successive pocket so that the shirred casings within may be stuffed. A stuffing horn moves between a stuffing position and an indexing position that is clear of the strand drum. A method for automating the stuffing of shirred casings is disclosed as well.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The labor intensive nature of handling flexible moisturized shirred casing strands is solved through the use of a package formed of a belt, an automated stuffing machine for receiving the belt, and a method for stuffing shirred casing stored in a belt. The belt provides structural integrity to the casing strand to ease handling. The machine provides a simple means to take advantage of the improved structural integrity. The method provides a means to use the belt and machine to improve efficiency of the stuffing operation.

An overwrap belt 12 is used as a package 10 for the shirred casing strands 14. The belt 12 contains multiple shirred casing strands 14 in pockets 16, preferably having an evenly spaced format. The shirred casing strands 14 are positioned generally transverse to the length of the overwrap belt 12.

Figures 1, 2:
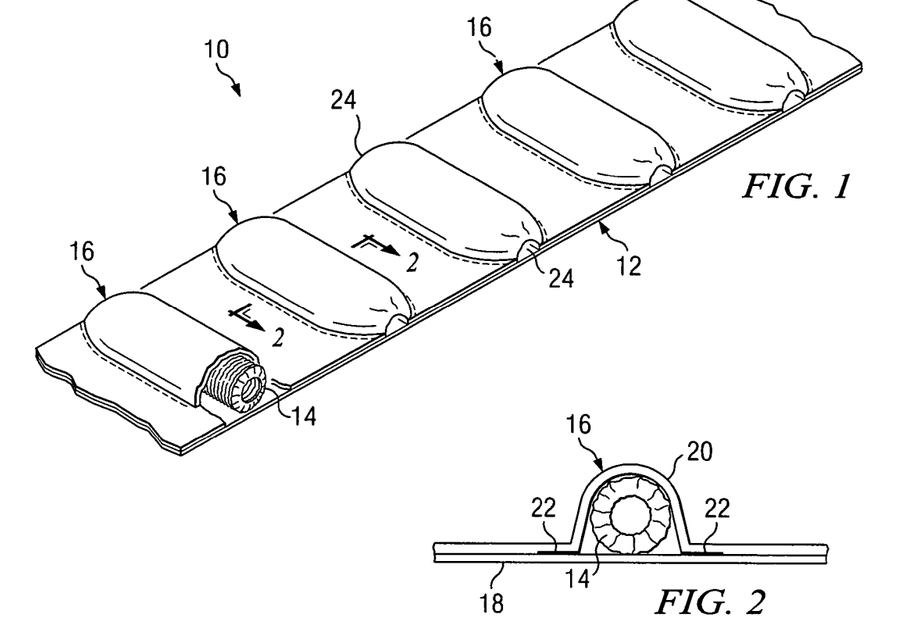
FIG. 1 is a schematic view of a package for casing material formed as a belt with pockets.
FIG. 2 is a cross-sectional view of the package of FIG. 1.
Figure 3:
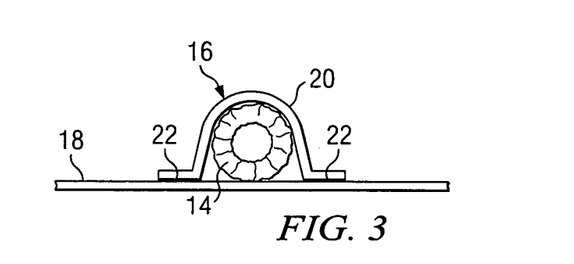
FIG. 3 is a cross-sectional view of a package similar to that of FIG. 1.

An overwrap belt 12 may be made in many ways. One embodiment is to have a belt layer 18 of material and a pocket layer 20 of material bonded to the belt layer 18 a discrete bonds 20 create pockets 16 as shown in FIG. 1. The shirred casing strand 14 is positioned inside the pockets 16. The pocket layer 20 may be discrete strips generally the size of the pockets 16 as shown in FIG. 3, or may be a continuous layer as shown in FIG. 2. Alternatively, the belt 12 may be formed of discrete overwrap pockets linked together in a uniformly spaced relationship to form a belt. Alternatively, discrete overwrap pockets 16 may be linked to a belt 12. The discrete pockets 16 may be linked together or secured to a belt 12 by any bonding method appropriate for the material of the overwrap pockets 16, including: thermal bonding; ultrasonic bonding; adhesive bonding; and mechanical bonding (sewn, stapled, tab-in-slot, etc.).

An overwrap belt 12 may be made of a variety of different materials. Belt 12 may be constructed of 3 mil polyethylene, which is strong enough to hold the weight of moisturized shirred casing strands 14 and flexible enough for easy handling. Alternative materials for forming an overwrap belt 12 include any other polymers, of various thickness; fibrous material, synthetic or natural, woven or nonwoven; laminates or composites. Depending on the preferred moisture transfer rate, the material may be perforated, have a high moisture transfer rate, a low moisture transfer rate, or even be impermeable. In order to get a combination of characteristics, more than one type of material may be used for the various parts of an overwrap belt. For example, a rigid low friction film may be used for the belt layer 18 for ease of handling while a highly permeable nonwoven material or apertured film may be used for the pocket layer 20 to create a highly permeable pocket 16.

The pockets 16 may be formed by bonding two strips of material together. The bonds 22 may be formed by any bonding method appropriate for the material being used, including: thermal bonding; ultrasonic bonding; adhesive bonding; and mechanical bonding (sewn, stapled, tab-in-slot, etc.). For instance, a belt constructed of 3-mil polyethylene may be bonded with a thermal bond as shown in FIG. 2. In contrast, a natural fiber material would be better bonded with a mechanical bond, such as sewing. The type of bond 22 used will be dependent on the material used and the preferred moisture transfer rate at the resultant bond.

Figure 4A:
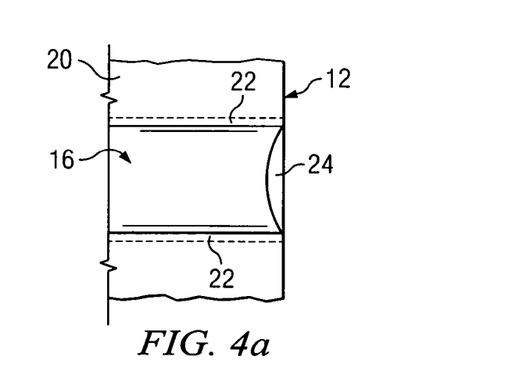
FIG. 4a is a plan view of a pocket with an open end.
Figure 4B:
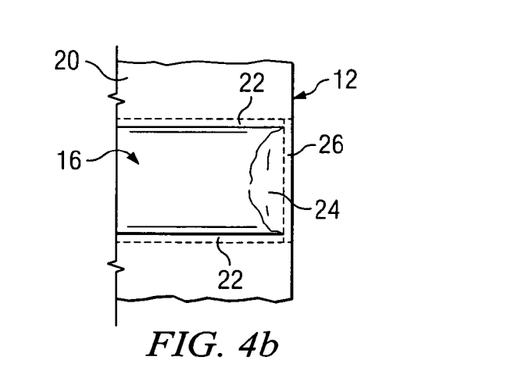
FIG. 4b is a plan view of a pocket with an end closed by a transverse bond.
Figure 4C:
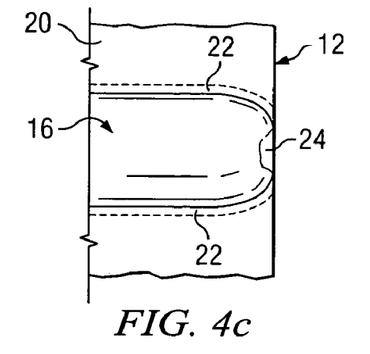
FIG. 4c is a plan view of a pocket with an open end with tapered bonds.
Figure 4D:
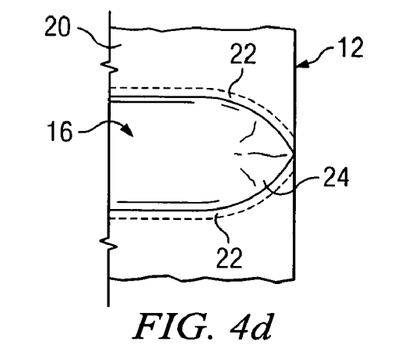
FIG. 4d is a plan view of a pocket with a closed end formed by intersecting tapered bonds.

The pockets 16 of an overwrap belt 12 are elongated and have two ends 24. The ends 24 of the pocket 16 may either be open, as shown in FIG. 4a and FIG. 4c, or closed, as shown in FIG. 4b and FIG. 4d. Closed ends 24 provide a more secure pocket 16 and prevent the shirred casings 14 from expanding out of the pocket 16 when moisturized, or falling out of the pocket 16 when being handled. A closed end 24 may also be used to create an impermeable pocket 16. An impermeable pocket 16 may be used to prevent contamination of the shirred casing 14 between placement of the shirred casing 14 in the pocket 16 and stuffing the shirred casing 14 with food. For instance, the shirred casings 14 may be pre-moisturized before being placed in the impermeable pocket 16, or the moisture could be added to an impermeable pocket 16 along with the shirred casing 14. An open end 24 provides easier access for the stuffing horn 52 to enter the shirred casing 14 or an easier exit for the stuffing horn when pushing the first end of the shirred casing 14 out of the pocket 16, as discussed below. An open end 24 can also allow easier access to the shirred casing 14 for soaking in the pocket 16. For instance, an overwrap belt 12 with open ends 24 may be placed in a soaking tank for soaking the shirred casings 14 in the pocket 16 before being used in the stuffing process.

Alternatively, it is possible that the shirred casings 14 in an overwrap belt 12 may be shipped in a container that can be used as a soaking tank. For instance the shirred casings 14 in the overwrap belt 12 may be shipped in a large bag within a rigid box. The box may be opened, the bag may be opened, and the bag may then be filled with water while remaining in the box. This effectively removes the need for additional soaking tanks and prevents the recycling of soaking water, a source of contamination. This is possible because the overwrap belt 12 can contain and support the shirred casing 14 while allowing fluid into the pockets 16. The overwrap belt 12 may then be fed directly into the stuffing machine 40 with minimal handling, further reducing the risk of contamination.

Also, the overwrap belt 12 may be shipped with the shirred casings 14 at a lower moisture level than needed to be stuffed and then moisture is added prior to stuffing without the need of a soaking tank or the worry of contamination during soaking.

A pocket 16 may be formed of two generally parallel transverse bonds 22 spaced to provide a pocket for the shirred casing as shown in FIGS. 4a-4d. A closed end 24 may be formed by providing a longitudinal bond 26 that intersects the two transverse bonds 22, as shown in FIG. 4b, or by having the transverse bonds 22 intersect each other as shown in FIG. 4d. An open end 24 may include a tapering of the transverse bonds 22 towards each other to provide an opening that is narrower than the pocket 16, as shown in FIG. 4c. A narrow opening helps to prevent the shirred casing 14 from falling out of the open end 24, or expanding out of the open end 24, while also providing easy access for the stuffing horn 52.

Figure 5:
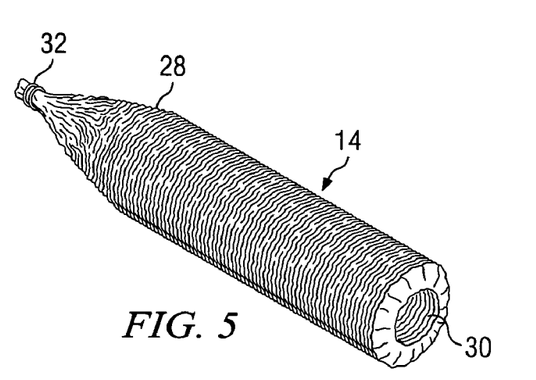
FIG. 5 is a schematic view of a shirred strand of shirred casing material.

The shirred casing 14 has a first end 28 and a bore 30. The bore 30 extends the length of the shirred casing 14. The first end 28 of the shirred casing 14 may be closed as shown in FIG. 5. A clip 32 may be used to close the first end 28 of the shirred casing 14. Other closures known in the art may be used as well, such as a knot, sewn closure, or any other closure suitable for use with the material of the shirred casing 14. Having the first end 28 of the shirred casing 14 closed aids in the automation of the process. When the belt 12 moves a particular shirred casing 14 into position, the stuffing horn 52 will enter the bore 30 of the shirred casing 14 until it meets the closure at the first end 28. The stuffing horn 52 will either stop near the first end 28 or push the first end 28 out of the pocket 16. First end 28 may be closed any time up to this point. A clip 32 may close first end 28 prior to placement of shirred casing 14 into pocket 16, or may close first end 28 just prior to the pumping of food product. Food product will begin to flow through the stuffing horn 52 and push the first end 28 towards an automatic clipping mechanism (not shown). Once the first end 28 has passed the automatic clipping mechanism by a preset distance, the automatic clipping mechanism will clip the filled casing, creating a stuffed food product. The stuffing machine 40 will continue to pump food product and clip the filled casing until the shirred casing 14 is depleted. After the shirred casing 14 is depleted, the stuffing horn 52 will retract from the now empty pocket 16. The overwrap belt 12 will then be indexed forward to place the next pocket 16 in position. The stuffing horn 52 will enter the next pocket 16 that is now in position, and repeat the above stuffing process on the shirred casing 14 in the next pocket 16. One of the advantages of the overwrap belt 12 is that the overwrap material (pocket 16) is easily removed from the vicinity of the stuffing horn 52 following stuffing of the shirred casing 14.

Figure 6:
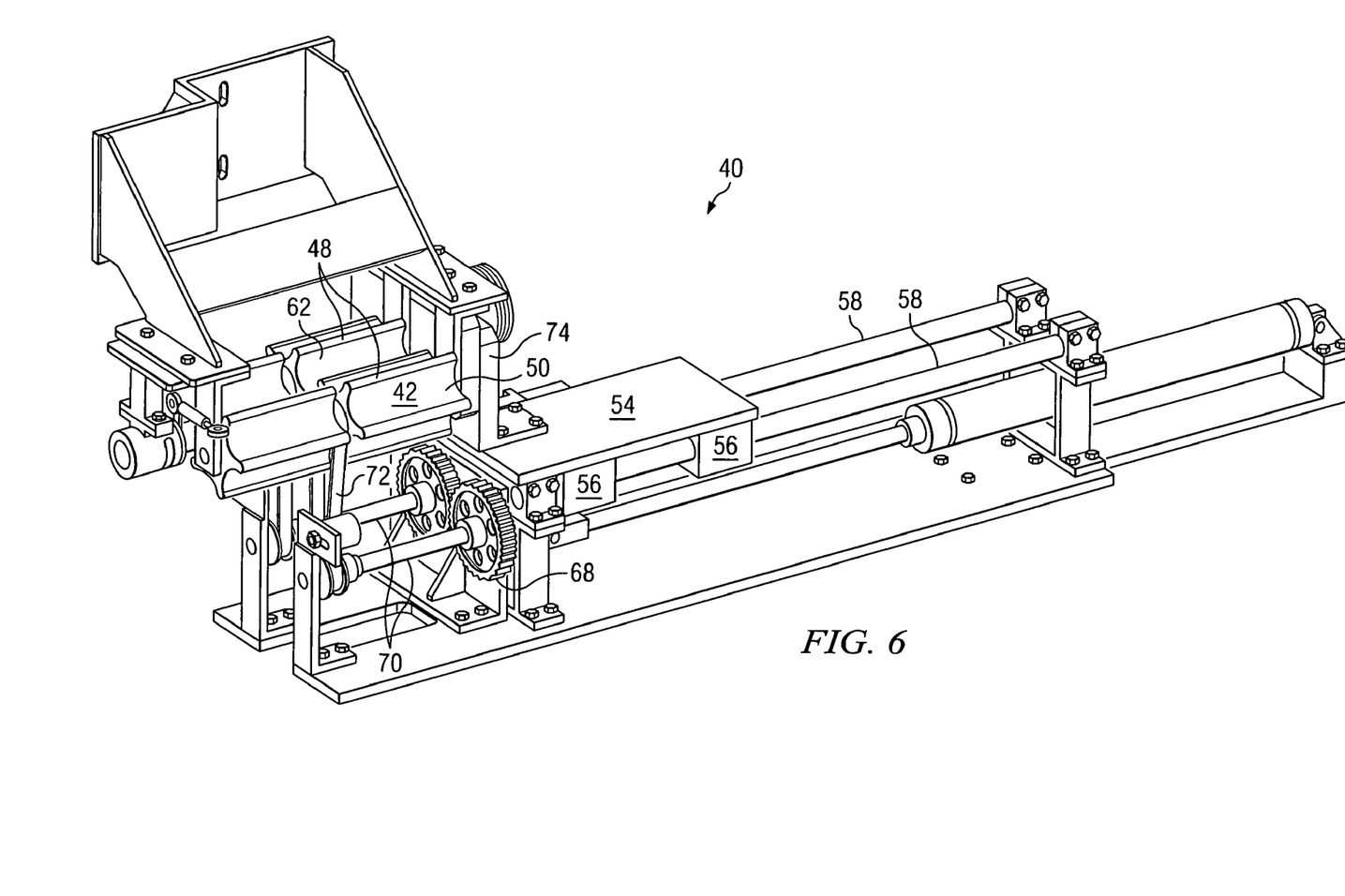
FIG. 6 is a schematic isometric view of an indexing stuffing machine.
Figure 7:
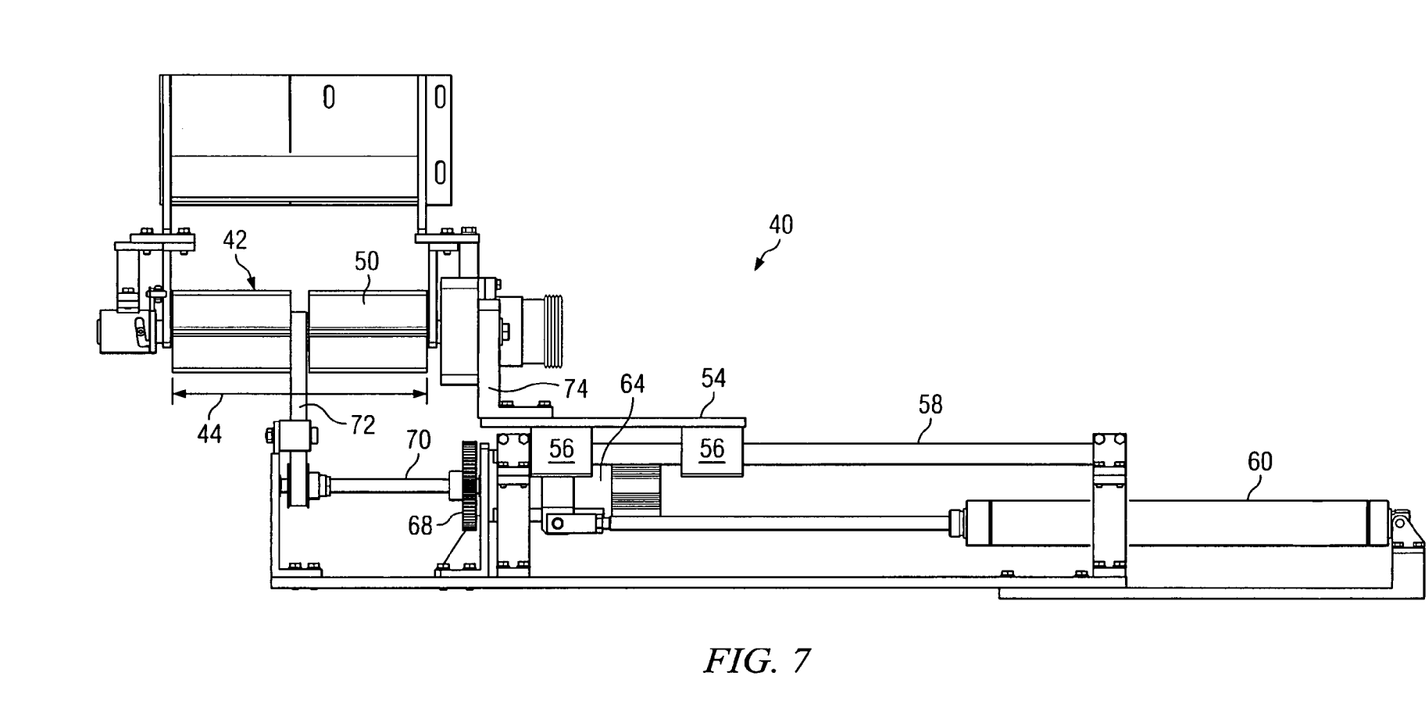
FIG. 7 is a schematic side view of the machine in FIG. 6 with the stuffing horn in a first position.
Figure 8:
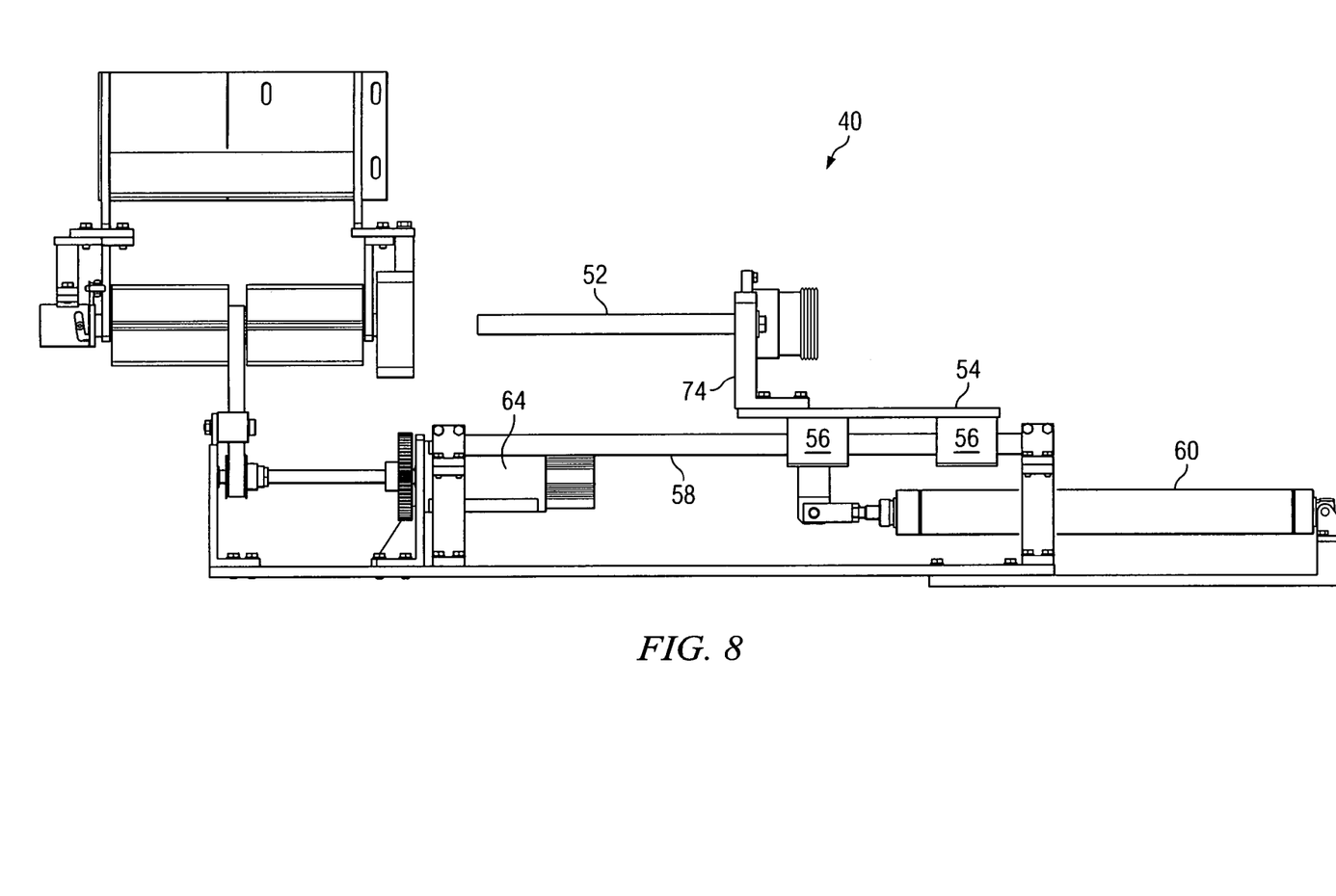
FIG. 8 is a schematic side view of the machine of FIG. 6 with the stuffing horn in a second position.
Figure 9:
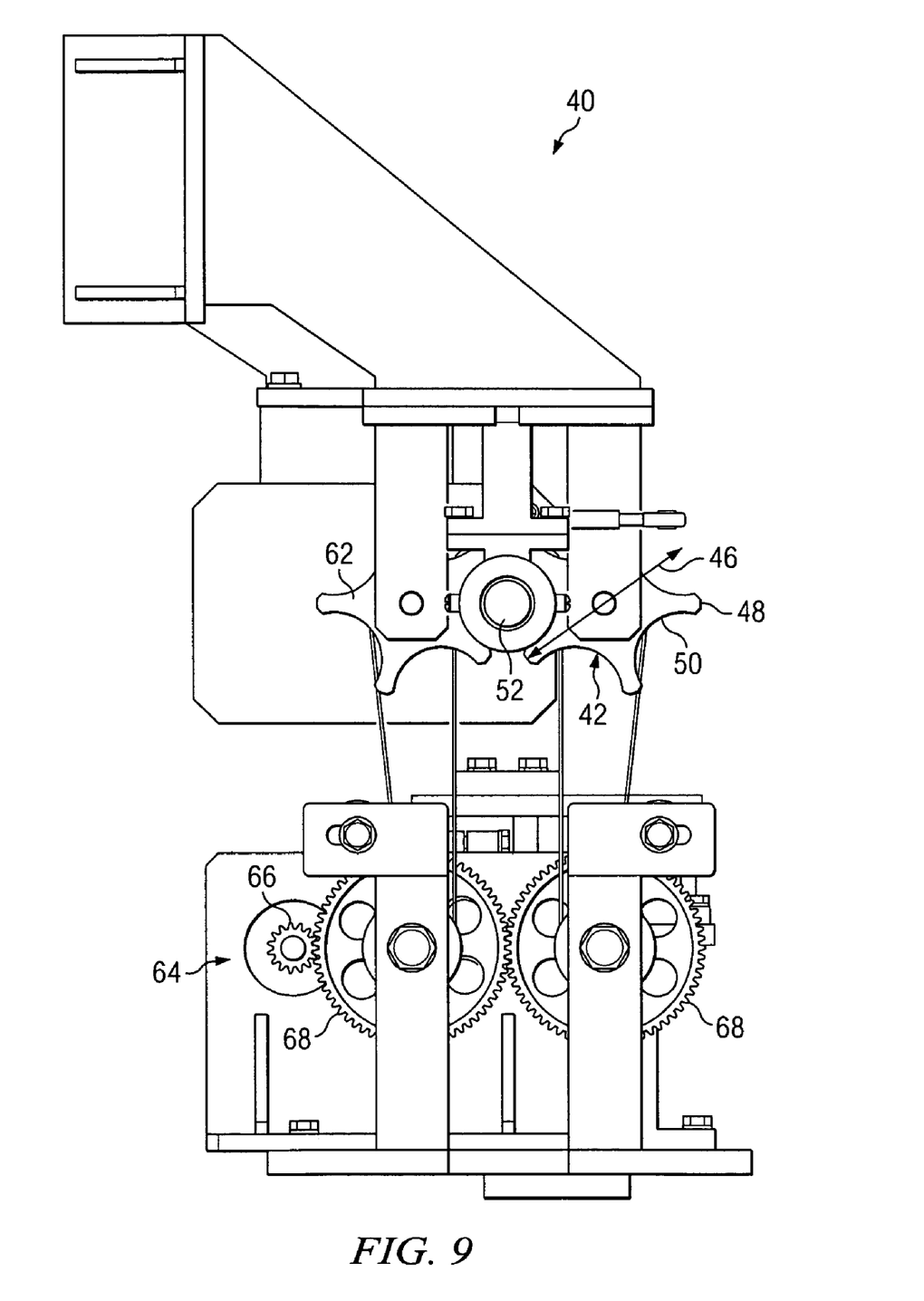
FIG. 9 is a schematic end view of the machine of FIG. 6.
Figure 10:
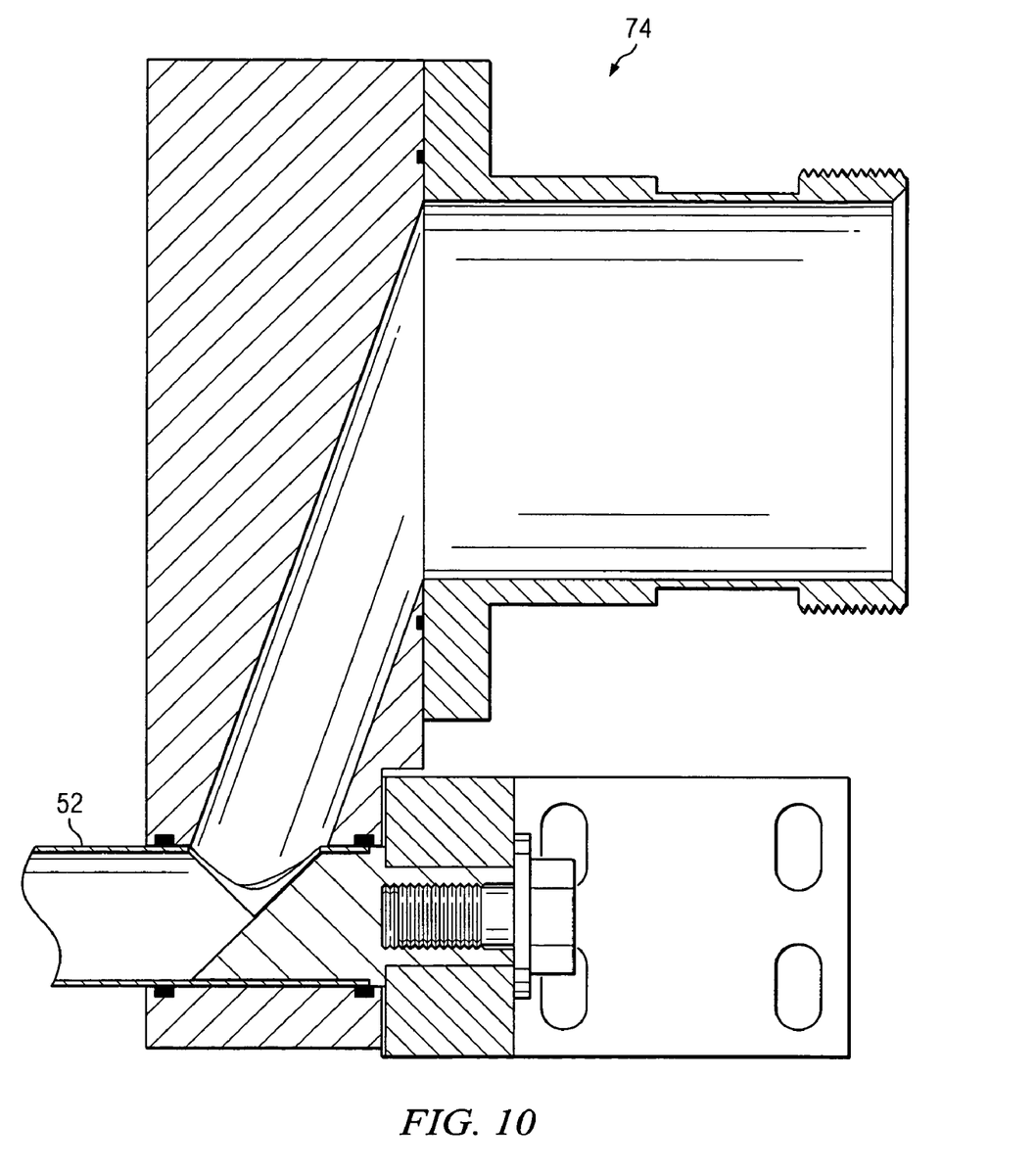
FIG. 10 is a schematic sectional view of the food manifold of the machine in FIG. 6.
Figure 11:
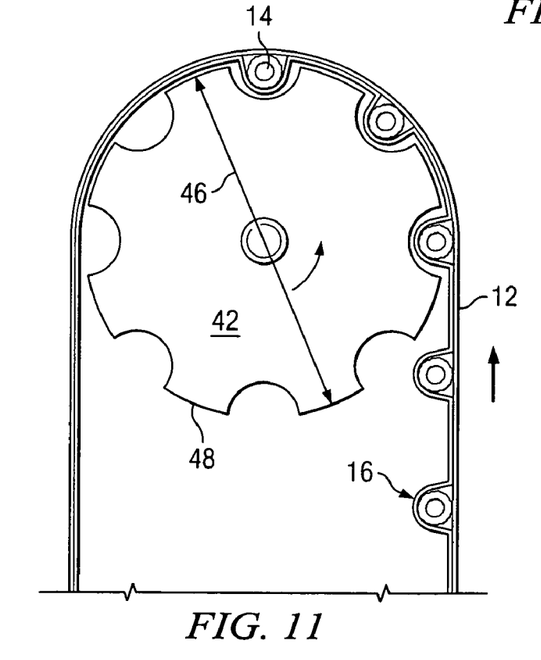
FIG. 11 is an end view of an indexing mechanism.

A stuffing machine 40 is used to take advantage of the belt 12. The machine 40 has a strand drum 42 that is shaped to receive the pockets 16 on belt 12. The strand drum 42 has a length 44 and a diameter 46, the diameter 46 being defined by an outer surface 48. The outer surface 48 has at least one indention 50 to at least partially receive a pocket 16. As shown in FIG. 10, each indention 50 can fully receive and support a pocket 16. Alternatively, the strand drum 42 may be paired with a second strand drum 62, as shown in FIGS. 6-8. The opposing strand drums 42 act in unison and have indentions 50 shaped to fully receive and support pocket 16 together. The strand drum 42 is designed to position a pocket 16 and secure consecutive pockets 16 in the same position.

Machine 40 includes a moveable stuffing horn 52. The stuffing horn 52 is attached to a food source via a pump and conduit (not shown). The conduit attaches to manifold 74, which directs pumped food into stuffing horn 52. Various valves and pump controls meter the flow of food into the manifold 74. The stuffing horn 52 is moveable from a first position shown in FIG. 7 to a second position shown in FIG. 8. The first position is defined by the stuffing horn 52 being inserted into pocket 16 received in indentation 50. This allows the stuffing horn 52 to be inserted through the bore 30 of shirred casing 14 and fill shirred casing 14 with food. The second position is defined by the stuffing horn 52 being clear of the strand drum 42 to allow rotation of the drum to position the next pocket 16. As shown in FIGS. 6-9, the second position may be achieved by moving the stuffing horn 52 linearly, parallel to the length 44 of strand drum 42. This may be achieved by mounting stuffing horn 52 to a slide base 54. The sliding base 54 may have slide bushings 56 attached to slide rails 58 to allow consistent linear movement of stuffing horn 52. Slide base 54 may be moved by a slide cylinder 60, as shown in FIGS. 6-8. Slide cylinder 60 may be a typical hydraulic cylinder or pneumatic cylinder. Alternatively, slide base 54 may be driven by a screw motor, chain device, or any other linear drive mechanism.

The strand drum 42 is rotated by a motor 64 to position a pocket 16 so that the shirred casing 14 within pocket 16 may be stuffed by stuffing horn 52. The machine 40 of FIGS. 6-8 uses a second strand drum 62 and shows the details of how the motor 64 may be connected to the paired strand drums 42, 62 so that they work in unison. Motor 64 turns drive gear 66. Drive gear 66 engages driven gears 68, thereby causing driven gears 68 to rotate in unison, but in opposite directions, as shown in FIG. 8. Driven gears 68 rotate drive shafts 70. Drive shafts 70 each engage a drive belt 72. Drive belt 72 may be a toothed timing belt, as shown in FIG. 7. One drive belt 72 rotates strand drum 42 while the other drive belt 72 rotates second strand drum 62. As shown in FIGS. 6-7, drive belt 72 may bisect strand drum 42 and second strand drum 62. The above description of the drive mechanism between motor 64 and drums 42, 62 is merely an example of one drive mechanism. Many variations may be made, such as direct drive of a motor 64 to strand drum 42, 62, or a drive including only gears, or a purely hydraulic drive.

The machine 40 and belt 12 work together to automate the stuffing process described herein. A string of shirred casing 14 is placed in pocket 16 on belt 12, as described above. Belt 12 is fed into machine 40 so that it is received by strand drum 42, the indexing mechanism of machine 40. Stuffing horn 52 may then move from a second position into a first position, engaging the bore 30 of shirred casing 14 in pocket 16. The first end 28 of shirred casing 14 is secured, as shown in FIG. 5, either prior to being put in pocket 16 or later, but prior to food being pumped through stuffing horn 52. Once stuffing horn 52 is in a first position and end 28 is secured, food is pumped through stuffing horn 52 to fill shirred casing 14. After shirred casing 14 is depleted, stuffing horn 52 is moved to a second position and the indexing mechanism positions the next pocket 16 on belt 12 to repeat the procedure. As the shirred casing 14 is stuffed with food, a separate closure mechanism, such as a clipper, may clip the filled casing at intervals to create individual food products.

Figure 12:
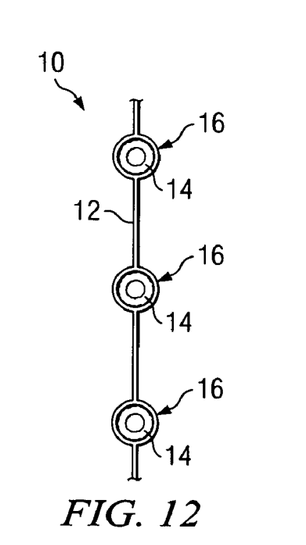
FIG. 12 is a sectional view of a package for casing material formed as a belt with pockets.

As shown in FIG. 12, the overwrap belt 12 may also be formed so that the web between pockets 46 is centered on pockets 16. Belt 12, as shown in FIG. 12, is particularly useful with stuffing machine 40, as shown in FIGS. 6-10, having two strand drums 42, 62.

A number of embodiments of the invention have been described. Nevertheless, it will be understood that various modifications may be made without departing from the spirit and scope of the invention. For example, the overwrap belt may be used with non-shirred casing material. Accordingly, other embodiments are within the scope of the following claims.

What is claimed is:

1. A package for feeding food casing material into an automated food casing stuffing machine, the package comprising:
    a belt having a length greater than a width and including a plurality of elongated pockets configured to engage indentations in a drum of an automated food casing stuffing machine;
    the plurality of pockets attached with an elongated axis oriented transverse to the length of the belt, each pocket substantially enclosing shirred casing material comprising a material different from the associated pocket, the shirred casing material positioned in the plurality of pockets prior to engaging a drum of an automated food casing stuffing machine, an open end of the shirred casing material and an open end of the enclosing pocket aligned to receive an automated stuffing horn while the shirred casing material is substantially enclosed by the pocket such that the shirred casing material is removed from the enclosing pocket in connection with stuffing the shirred casing material, the pockets spaced at substantially even intervals along the belt, and
    wherein the plurality of pockets maintain, independent of a soak tank, the shirred casing material above a predetermined moisture level prior to loading the belt on the automated food casing stuffing machine.

2. The package of claim 1, wherein the pockets are sealed to maintain a moisture level in the casing material, prevent contamination or extend shelf life.

3. The package of claim 1, wherein the pockets allow fluid transmission into the pocket.

4. The package of claim 3, wherein the pocket is formed of fluid permeable material.

5. The package of claim 3, wherein the pocket has openings suitable for fluid transmission.

6. The package of claim 1, wherein the shirred casing material is additionally soaked in a soak tank prior to loading the belt on the automated food casing stuffing machine.

7. A package for storing food casing material, the package comprising:
    a plurality of elongated storage pockets, each pocket substantially enclosing shirred casing material and secure the shirred casing material with an elongated axis oriented transverse to a length of a belt having the length greater than a width, each pocket connected to the belt and configured to engage indentations in a drum of an automated food casing stuffing machine, the shirred casing material positioned in the plurality of pockets prior to engaging a drum of an automated food casing stuffing machine, an open end of the shirred casing material and an open end of the enclosing pocket aligned to receive an automated stuffing horn while the shirred casing material is substantially enclosed by the pocket such that the shirred casing material is removed from the enclosing pocket in connection with stuffing the shirred casing material, the plurality of pockets maintain, independent of a soak tank, the shirred casing material above a predetermined moisture level prior to loading the belt on the automated food casing stuffing machine, the belt and the shirred casing material are different material.

8. The package of claim 7, wherein the pockets are sealed to maintain a moisture level in the casing material.

9. The package of claim 7, wherein the pockets are permeable to allow moisturization of the casing material after placement in the pockets.

10. The package of claim 7, wherein the belt is comprised of a continuous sheet of material.

11. The package of claim 10, wherein the pockets are formed by selectively bonding a second continuous sheet of material to the belt.

12. The package of claim 7, wherein the belt is comprised of multiple continuous sheets spaced to form the width of the belt, each sheet having a width substantially less than the width of the belt.

13. The package of claim 7, wherein the pockets are attached to each other to form the belt.

14. A shirred food casing material packaged in a belt of spaced pockets connected to the belt, the belt having a length greater than a width comprises a material different from the shirred food casing material and facilitates indexed processing of the food casing material, the pockets being attached with an elongated axis oriented transverse to the length belt and configured to engage indentations in a drum of an automated food casing stuffing machine, each pocket substantially enclosing shirred casing material, the shirred casing material positioned in the plurality of pockets prior to engaging a drum of an automated food casing stuffing machine, an open end of the shirred casing and an open end of the enclosing pocket aligned to receive an automated stuffing horn while the shirred casing material is substantially enclosed by the pocket such that the shirred casing material is removed from the enclosing pocket in connection with stuffing the shirred casing material, the plurality of pockets maintain, independent of a soak tank, the shirred casing material above a predetermined moisture level prior to loading the belt on the automated food casing stuffing machine.

* * * * *